(12) United States Patent  
Leone

(10) Patent No.: US 8,474,004 B2  
(45) Date of Patent: Jun. 25, 2013

(54) SYSTEM FOR IMPLEMENTING SECURITY ON TELECOMMUNICATIONS TERMINALS

(75) Inventor: Manuel Leone, Turin (IT)

(73) Assignee: Telecom Italia S.p.A., Milan (IT)

( * ) Notice: Subject to any disclaimer, the term of this patent is extended or adjusted under 35 U.S.C. 154(b) by 541 days.

(21) Appl. No.: 12/309,810

(22) PCT Filed: Jul. 31, 2006

(86) PCT No.: PCT/EP2006/007570  
§ 371 (c)(1),  
(2), (4) Date: Jun. 24, 2009

(87) PCT Pub. No.: WO2008/014800  
PCT Pub. Date: Feb. 7, 2008

(65) Prior Publication Data  
US 2009/0254993 A1 Oct. 8, 2009

(51) Int. Cl.  
*G06F 21/00* (2006.01)

(52) U.S. Cl.  
USPC ...... 726/1; 726/22; 726/23; 726/25; 713/166; 713/170; 709/203; 380/59; 705/3; 455/410

(58) Field of Classification Search  
USPC ...................................................... 726/1, 25  
See application file for complete search history.

(56) References Cited

U.S. PATENT DOCUMENTS

| | | | |
|---|---|---|---|
| 6,775,536 B1 * | 8/2004 | Geiger et al. | 455/411 |
| 7,530,104 B1 * | 5/2009 | Thrower et al. | 726/22 |
| 7,774,620 B1 * | 8/2010 | Stott et al. | 713/193 |
| 7,877,780 B2 * | 1/2011 | Kolawa et al. | 726/1 |
| 2002/0104014 A1 * | 8/2002 | Zobel et al. | 713/200 |
| 2004/0177270 A1 * | 9/2004 | Little et al. | 713/200 |
| 2005/0003398 A1 | 1/2005 | Tao et al. | |
| 2005/0120209 A1 * | 6/2005 | Kwon et al. | 713/161 |
| 2005/0125494 A1 * | 6/2005 | Horii et al. | 709/203 |
| 2005/0246534 A1 * | 11/2005 | Kirkup et al. | 713/170 |
| 2005/0268084 A1 * | 12/2005 | Adams et al. | 713/2 |
| 2006/0005019 A1 * | 1/2006 | Chao | 713/166 |

(Continued)

FOREIGN PATENT DOCUMENTS

| | | |
|---|---|---|
| EP | 1 361 527 A1 | 11/2003 |
| EP | 1 564 957 B1 | 8/2005 |
| WO | WO 00/50978 A1 | 8/2000 |
| WO | WO 2006/017757 A2 | 2/2006 |

OTHER PUBLICATIONS

Jennings, "An Agent-Based Approach for Building Complex Software Systems", Communications of the ACM Apr. 2001/vol. 44, No. 4.*

*Primary Examiner* — Morshed Mehedi  
(74) *Attorney, Agent, or Firm* — Finnegan, Henderson, Farabow, Garrett & Dunner, L.L.P.

(57) ABSTRACT

A system includes at least one telecommunications terminal having data processing capabilities, the telecommunications terminal being susceptible of having installed thereon software applications, wherein each software application has associated therewith a respective indicator adapted to indicate a level of security of the software application, the level of security being susceptible of varying in time; a software agent executed by the at least one telecommunications terminal, the software agent being adapted to conditionally allow the installation of software applications on the telecommunications terminal based on the respective level of security; a server in communications relationship with the software agent, the server being adapted to dynamically calculate the level of security of the software applications, and to communicate to the software agent the calculated level of security of the software applications to be installed on the telecommunications terminal.

21 Claims, 7 Drawing Sheets

U.S. PATENT DOCUMENTS

| | | |
|---|---|---|
| 2006/0031938 A1 | 2/2006 | Choi |
| 2006/0090192 A1* | 4/2006 | Corby et al. ............... 726/1 |
| 2006/0095965 A1* | 5/2006 | Phillips et al. ............ 726/22 |
| 2006/0191010 A1* | 8/2006 | Benjamin ................. 726/23 |
| 2006/0191012 A1* | 8/2006 | Banzhof et al. ........... 726/25 |
| 2007/0067846 A1* | 3/2007 | McFarlane et al. ....... 726/25 |
| 2007/0143827 A1* | 6/2007 | Nicodemus et al. ........ 726/2 |
| 2007/0192867 A1* | 8/2007 | Miliefsky ................. 726/25 |

* cited by examiner

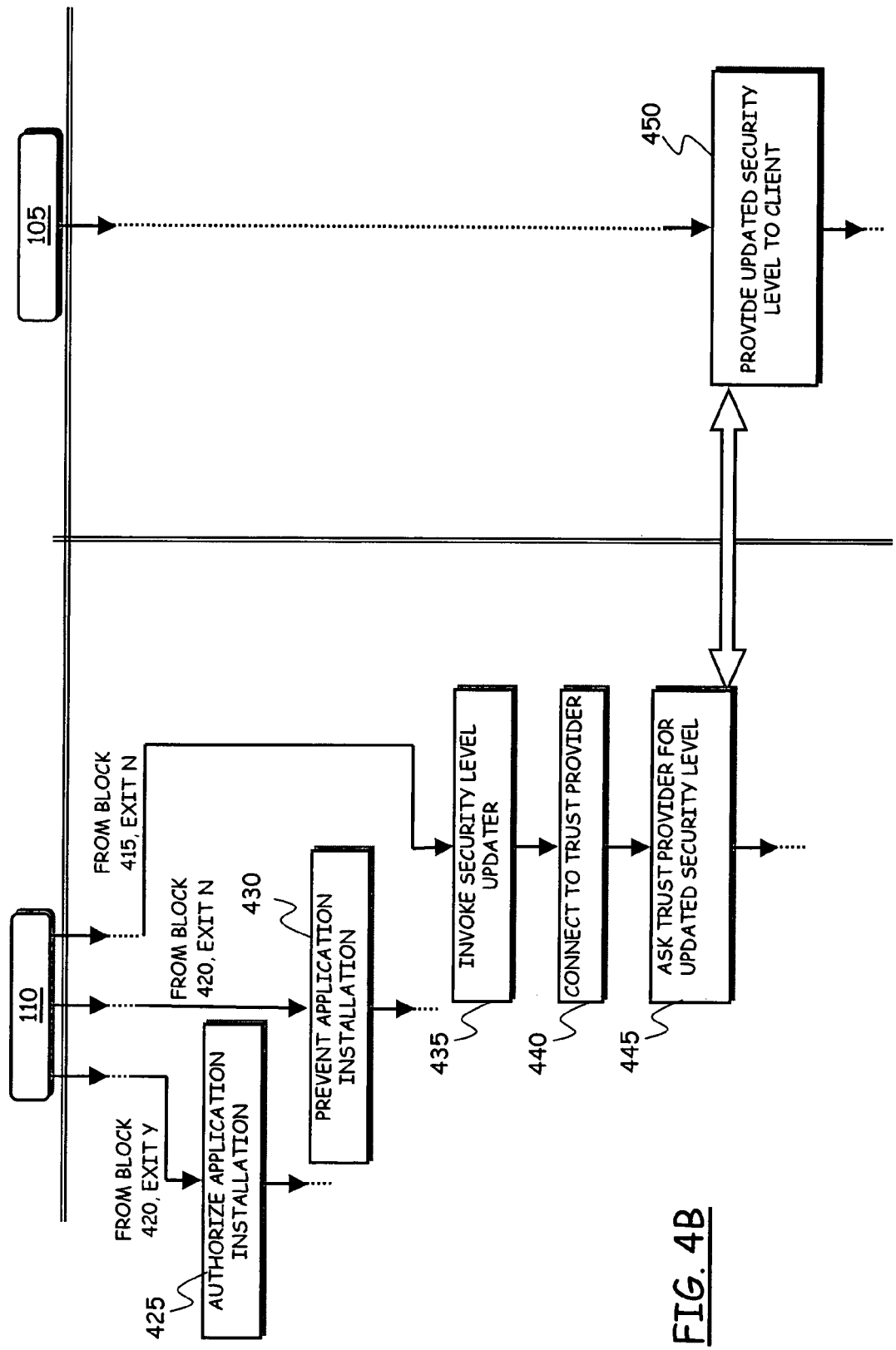

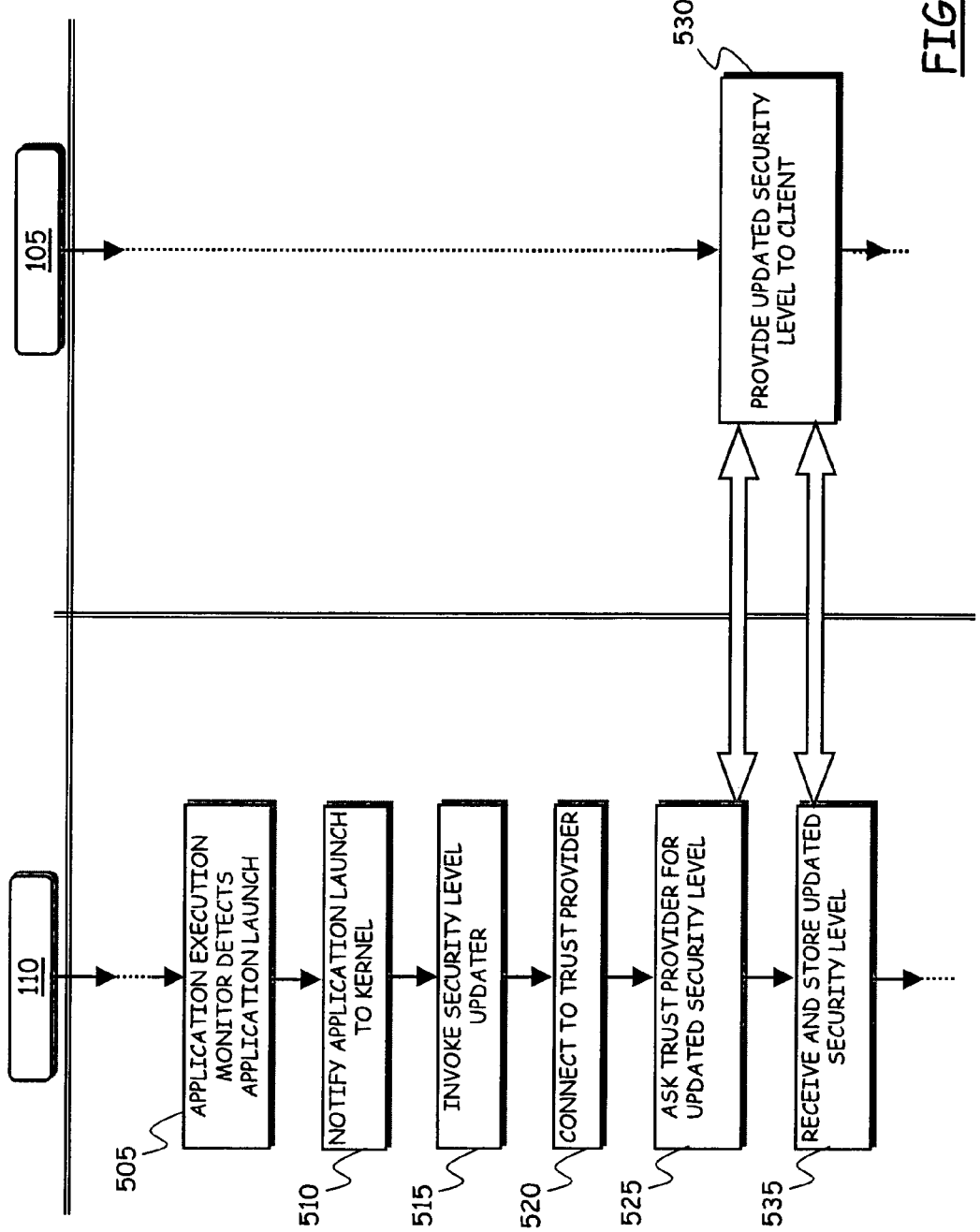

SYSTEM FOR IMPLEMENTING SECURITY ON TELECOMMUNICATIONS TERMINALS

CROSS REFERENCE TO RELATED APPLICATION

This application is a national phase application based on PCT/EP2006/007570, filed Jul. 31, 2006, the content of which is incorporated herein by reference.

BACKGROUND OF THE INVENTION

1. Field of the Invention

The present invention generally relates to the field of security enforcement on telecommunications terminals, either mobile or wired, and particularly to the enforcement of security of the application layer in telecommunications terminals having an open operating system, that allows the installation (and execution) of third-party software applications.

2. Description of Related Art

The diffusion and evolution of mobile telecommunications terminals (e.g., mobile phones of the last generation), in terms of computational power of the terminal, available communication bandwidth, availability of services and of software applications specifically designed for the telecommunications terminals, is widening the breadth of the services that the telecommunications terminals can make available to the users, and the modalities of accessing the telecommunications networks.

Nowadays, the availability of communication bandwidth and of computational power on mobile telecommunications terminals with an open operating system like Windows Mobile, Symbian, or SavaJe, has made it possible to offer new added-value services, and the adoption of "always on" connectivity profiles (i.e., the user of the telecommunications terminal is always connected to a telecommunications/data communications network, and can at any time access the offered services). Examples of these new services are the unified messaging (e-mail, instant messaging, Short Messaging Service—SMS—, Multimedia Messaging Service—MMS), secure access to enterprise's resources over IP (Internet Protocol) channels by the employees (for example by means of protected tunnels with protocols like TLS/SSL—Transport Security Layer/Secure Socket Layer—, IPsec—IP security—, L2TP—Layer 2 Tunnel Protocol—and the like), services of Digital Rights Management (DRM), access and exploitation of multimedia contents (based for example on the DVB-H—Digital Video Broadcasting-Handheld standard), access to enterprise's services and applications, and so on.

The availability of these powerful mobile telecommunications terminals is a great market opportunity, also considering the broad target of customers that can be reached by customized offers. However, such powerful terminals bring about security issues also in connection with the core business of the mobile telecommunications network operator. The mobile terminal is, under several respects, particularly vulnerable to software attacks: just to cite some examples, the mobile terminal is usually devoted to a personal use, it stores sensitive information (both of personal and of professional nature), it has a money credit associated with the SIM (Subscriber Identity Module), it stores information (like the IMSI—International Mobile Subscriber Identity—and the IMEI—International Mobile Equipment Identity) that allows an easy tracking of the user, it has access to wide communication bandwidth (e.g., GPRS/EDGE/UMTS), and it may implement different types of connectivity (like for example Wi-Fi, Bluetooth, IrDA—Infrared Device Application—, NFC—Near Field Communication, ZigBee).

Today, the security issues that involve mobile telecommunications terminals are mainly due to the sensitivity of the user (Social Engineering), and the diffusion of Trojan-type malware. A user of a mobile phone usually is less sensitive to security issues compared, for example, to a user of a Personal Computer (PC); this is in part due to the higher diffusion of mobile phones compared to PCs, and to the fact that a phone is generally perceived as a secure device, so users are not accustomed to consider that their mobile phones may be subject to software attacks.

Nowadays, the circulating malware is essentially of the Trojan type; thus, it rarely exploits the vulnerability of the software resident on the mobile terminal, rather it uses a "cover" application for installing on the terminal, after having obtained the user's authorization (and in this respect the low sensitivity of the user plays an important role), and then perpetrating the attacks for which it is designed (for example sending SMS to premium numbers, deleting user files and documents, illegally forwarding e-mail and other types of messages, replicating itself).

Several initiatives have been promoted for finding solutions to the increasing demand for higher security, driven in part by the diffusion of several malware applications. Some of the most important initiatives are the Microsoft Mobile-2-Market (http://msdn.microsoft.com/mobility/windowsmobile/partners/mobile2market/default.aspx), Symbian Signed (http://www.symbiansigned.com), OMTP (Open Mobile Terminal Platform) P6 Application Security Project (http://www.omtp.org), GSM-A MAS (Mobile Application Security) Project (http://www.gsmworld.com/using/security/mobile_application.shtml), Java MIDP (Mobile Information Device Profile) 2.0 (http://java.sun.com/products/midp/index.jsp).

In general, all the known initiatives are based on a same model, hereinafter referred to as the "trust model", which generally defines two macro-categories of software applications that can run on a mobile telecommunications terminal: trusted applications and non-trusted applications.

Non-trusted applications are digitally unsigned applications (or application digitally signed by untrusted Certification Authorities—CAs) whose genuinity cannot be assessed on the terminal when they are installed and/or executed; these applications are thus a potential source of attacks to the terminal, because there is no information about them and it is not possible to perform any check. For these reasons, non-trusted applications are allowed to access only a limited subset of resources of the telecommunications terminal, i.e. of APIs (Application Program Interfaces), exposed by the operating system, namely APIs that are not considered dangerous.

Trusted applications are instead digitally signed (by trusted CAs), and are allowed to access a wider set of exposed APIs. In particular, the APIs exposed by the operating system are grouped in different classes, according to a criterion of criticality of the accessed resources. The trusted, digitally signed applications are mapped onto a certain security level based on the CA that issued the digital certificate with which the application has been signed. Different security levels are defined, corresponding to different "root certificates": an application is certified with respect to a certificate chain which refers to one of the root certificates present on the terminal. The security level to be assigned to the application is determined on the basis of the security level assigned to the root certificate used during the phase of verification. The security level assigned to the application determines the set of resources that the application can access, and the way the application can interact with them. In some cases, an application having been assigned a certain security level does not gain access to all the resources specified for that level, but only to those specified by the software vendor during the certification process.

The use of the digital signature mechanism further allows implementing an application revocation mechanism, when the applications are compromised or violate specific security policies. For example, in case of availability of connectivity, the mobile terminal, before installing and/or executing an application, may ascertain whether the considered application has been revoked; this may be done by downloading and checking a Certificate Revocation List (CRL), or exploiting protocols like the Online Certificate Status Protocol (OCSP), so as to get an immediate response about the validity of the certificate tied to the signing key, and therefore of the related signed application.

An example of implementation of the trust model can be found in EP-A-1361527 in which a method is described for loading an application into a device, and generally for downloading applications into portable devices, typically mobile telephones. The method includes the steps of: downloading the application with a signature to the device; coupling the signature of the application to a predefined attribute certificate stored in the device; and installing the application together with said attribute certificate. Preferably, the signature of the application is coupled to a root certificate which in turn is linking the application to a predefined attribute certificate.

Another example of implementation of the trust model can be found in WO 2006/017757 in which a method and an apparatus are disclosed for providing enhanced security using service provider authentication. In addition to authenticating an application signature against a root certificate stored on the network node, a first carrier identification associated with the application is compared to a second carrier identification. If the first and second carrier identifications match, then the application can be assigned to a trusted protection domain and granted permissions which provide privileged access to the network node. For example, the application can be granted permission to be installed and/or executed on the network node. Otherwise the application can be denied privileged access. Accordingly, a carriers applications will be only installed onto network nodes that are intended recipients of the applications.

Still another example of implementation of the trust model can be found in US 2005/03398 in which a single machine has entities running in an untrusted environment and entities running in a trusted environment, the trustworthiness of the entities in the trusted environment is projected to the entities in the untrusted environment. This is applicable, for example, to Microsoft's Next Generation Secure Computing Base (NG-SCB), where a regular operating system (e.g., the Windows operating system) hosts a secure operating system (e.g., the nexus).

SUMMARY OF THE INVENTION

The Applicant has observed that the trust model discussed in the foregoing is affected by some problems.

The certification of applications by CAs has a non-negligible cost; thus, only those software producers/vendors capable of sustaining the certification costs will more likely be able to stay on the market (i.e., to offer powerful applications capable of accessing the most interesting APIs exposed by the operating systems of the mobile terminals). In this respect, it should be observed that the costs for having software applications certified by CAs are high also because it is not sufficient to have an application certified the first time it is put on the market: the certification needs to be repeated for each new release of the application, even if the changes are few or if a service pack or an application patch is released by a vendor.

The problem of certification costs is particularly felt in the case of open-source software: the Applicant believes that it would be important that also open source-software applications may gain access to all the APIs and resources of operating systems, but the adoption of the above-described trust model, based on certification by CAsm may render this impossible, because it is not clear who will sustain the costs of the certification.

Another problem of the trust model resides in the application revocation mechanism mentioned above. The revocation of an application could or should be authorized by several players involved within the trust model, like mobile phone users, software producers/vendors, network operators, mobile terminals manufacturers, and this complicates the design of the process and the assignment of the different roles and responsibilities. Legal issues are also involved, due to the different legislations in different countries: this may make it difficult to create a unique framework globally recognized and legally supported by the different countries adapted to offer a homogenous service profile.

Still another problem of the trust model is that a software application is assigned a certain security level based on a set of standard tests, involving a static analysis of the application code (i.e., an analysis that does not consider what the application would actually do when running in the real environment). However, this static analysis may not be very effective: it cannot reconstruct and evaluate all the possible execution paths of the application. For this reason, some certification processes, like Symbian Signed, require a declaration from the software producer about the non-malicious behavior of the application. The situation is even more complex when software vulnerabilities are considered (bugs of software applications that may be exploited by the malware for propagating and making damages). Determining, through a static analysis, the presence of vulnerabilities is nowadays a challenging problem. Known solutions like Java, Symbian Signed, Microsoft M2M provide for a static assignment of a security level to the applications, determined during the certification phase. This kind of certification, as well as other types like Common Criteria or ITSEC (Information Technology Security Evaluation Criteria) certification, does not prevent the application from containing serious vulnerabilities which can be exploited by malicious software to perform attacks. Moreover, the certification does not change even if a critical vulnerability is determined and one or more exploits have been released. This static assignment is considered by the Applicant a strong limitation, both for the users (restrictions on the usability of the software applications) and for the business models that can be implemented.

In view of the state of the art outlined in the foregoing, the Applicant has tackled the problem of implementing a security scheme not affected by the problems and limitations discussed above.

In particular, the Applicant has tackled the problem of increasing the security of the application layer in telecommunications terminals having an open operating system.

The Applicant has found that the problems evidenced by the known trust model can be overcome by providing a framework adapted to assign to software applications, that are installed and, possibly, executed by the telecommunications terminals, levels of security susceptible of varying in time, and by providing a framework adapted to dynamically manage the assigning of the levels of security to the applications.

In particular, the Applicant has found that the levels of security can be assigned based on a reputation of the software applications. By reputation of a software application there is meant the degree of trust of the software application. The reputation, i.e. the degree of trust of a software application, may be calculated based on information gathered from a plurality of information sources; the information useful for calculating the reputation of a software application may include information about number and gravity of discovered vulnerabilities, analysis of the software application code (executable and, possibly, source code), existence of exploits of the discovered vulnerabilities, time to release of patches, and the like.

For the purposes of the present invention, by "vulnerability" there is meant a weakness in a data processing system, allowing an attacker to violate the integrity, confidentiality, access control, availability, consistency or audit mechanism of the data processing system, or the data and/or applications it hosts. Vulnerabilities may result from bugs or design flaws in the system. A vulnerability can exist either only in theory, or could have a known exploit. Vulnerabilities are particularly critical when the program containing the vulnerability operates with special privileges, performs authentication or provides easy access to user data or facilities.

The dynamic calculation of the level of security of the software applications may be delegated to a server entity, operating on behalf of the users of the telecommunications terminals.

According to an aspect of the present invention, a system comprising at least one telecommunications terminal is provided.

The system comprises:
  at least one telecommunications terminal having data processing capabilities, the telecommunications terminal being susceptible of having installed thereon software applications, wherein each software application has associated therewith a respective indicator adapted to indicate a level of security of the software application, said level of security being susceptible of varying in time;
  a software agent executed by the at least one telecommunications terminal, said software agent being adapted to conditionally allow the installation of software applications on the telecommunications terminal based on the respective level of security;
  a server in communications relationship with the software agent, said server being adapted to dynamically calculate the level of security of the software applications, and to communicate to the software agent the calculated level of security of the software applications to be installed on said telecommunications terminal.

For the purpose of the present invention, by "level of security" of a software application there is intended a degree of trust that can be attributed to the software application, which determines the extent to which a telecommunications terminal allows access to its resources (APIs of the operating system).

According to a second aspect of the present invention, a telecommunications terminal is provided having data processing capabilities, and being susceptible of having installed thereon software applications, wherein each software application has associated thereto a respective indicator adapted to indicate a level of security of the software application. The telecommunications terminal comprises a software agent, adapted to be executed by the telecommunications terminal, said software agent being adapted to conditionally allow the installation of software applications on the telecommunications terminal based on the respective level of security, and to receive from a server updated levels of security of the software applications to be installed on said telecommunications terminal.

According to a third aspect of the present invention, a system provided comprising a server adapted to communicate with at least one telecommunications terminal having data processing capabilities, wherein the telecommunications terminal is susceptible of having installed thereon software applications, each software application having associated therewith a respective indicator adapted to indicate a level of security of the software application, said level of security being susceptible of varying in time, said server being adapted to dynamically calculate the level of security of the software applications, and to communicate to the software agent the calculated level of security of the software applications to be installed on said telecommunications terminal.

According to a fourth aspect of the present invention, a method is provided comprising conditionally allowing installation of a software application on a telecommunications terminal based on the a level of security of the software application. Said level of security is susceptible of varying in time, and the method further comprises having the telecommunications terminal receive an updated level of security of the software application by a server in communications relationship with the telecommunications terminal.

BRIEF DESCRIPTION OF THE DRAWINGS

The features and advantages of the present invention will be made apparent by reading the following detailed description of an embodiment thereof, provided merely by way on non-limitative example, description that will be conducted making reference for better clarity to the attached drawings, wherein:

FIGS. 4A, 4B and 4C show a simplified flowchart illustrating the main actions performed by the client component and the trust provided component in case of installation of a new software application on the terminal; and FIG. 5 shows a simplified flowchart illustrating the main actions performed by the client component and the trust provided component in case a software application installed on the terminal is launched.

DETAILED DESCRIPTION OF THE PREFERRED EMBODIMENT

Figure 1:
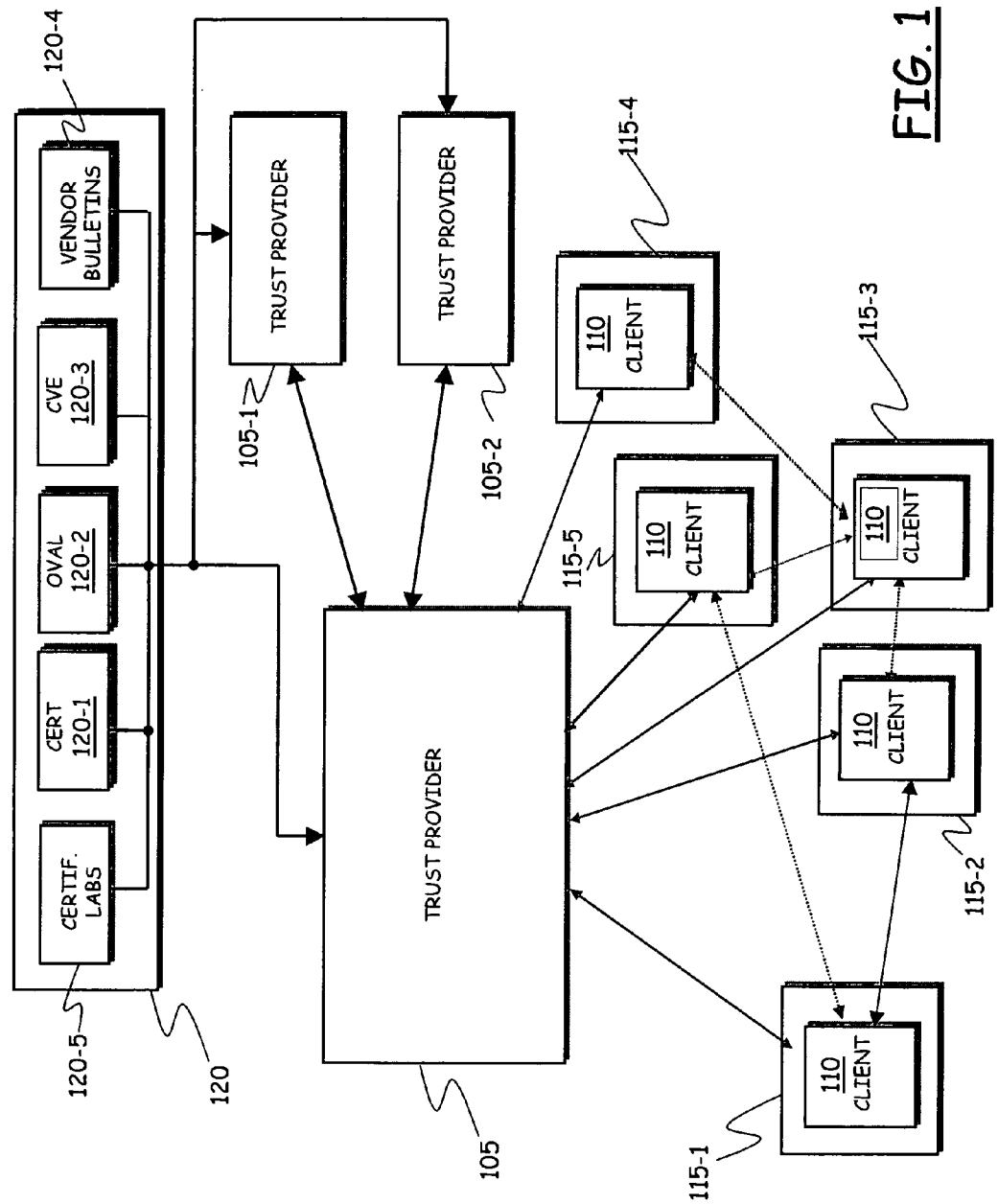
FIG. 1 schematically shows, in terms of functional blocks, the architecture of a system according to an embodiment of the present invention.

Making reference to the drawings, in FIG. 1 the architecture of a system according to an embodiment of the present invention is schematically shown, in terms of functional blocks.

The system is comprised of a trust provider component 105, operating as a server in respect of several client components 110, resident on mobile telecommunications terminals 115-1, 115-2, 115-3, 115-4, 115-5 of users.

The mobile communication terminals are for example mobile phones, PDAs (Personal Digital Assistants), smart phones, adapted to the use in mobile telecommunications network, particularly mobile telephony networks like GSM (Global System for Mobile communications), GPRS (General Packet Radio System), EDGE (Enhanced Data rate for GSM Evolution) or UMTS (Universal Mobile Telecommunications System) networks. It is however pointed out that although in this description reference is made to mobile communications terminals, this is not to be construed as a limitation of the present invention, which applies as well to wired telecommunications terminals.

The generic mobile terminal 115-1, 115-2, 115-3, 115-4, 115-5 has installed thereon an open operating system, like Windows Mobile, Symbian, or SavaJe, that controls the operation of the mobile terminals and allows the installation on the mobile terminals of third-party software applications. These software applications that may be installed on the mobile terminal may access the resources of the mobile terminal through APIs exposed by the operating system (APIs correspond to resources of the mobile terminal, thus hereinafter the terms "API" and "resource" will be regarded as synonyms).

In particular, the APIs exposed by the operating system are grouped in different classes, corresponding to different level of relevancy of the APIs for the mobile terminal security.

The software applications to be installed and executed on the mobile terminal have an associated security or trust level, that determines the set of APIs (one or more classes) that the application can access, and the relating access modality.

Typically the security or trust level is one of a plurality of greater that two values, corresponding to three of more sets of APIs that the application can conditionally access.

Examples of access modalities are the "allow always" modality, the "blanket" modality, the "one shot" modality and the "session" modality. In the "allow always" modality, the access request to a resource (i.e., to an API) by the software application is essentially transparent for the user, without requesting any direct interaction with the user (direct interactions may be through a prompt or the Graphical User Interface—GUI). In the "blanket" access modality, the software application may again access the resource in a way transparent to the user, exception made for the first time that the application requests access to the resource: in this case, an explicit authorization by the user is required; once the authorization is granted, it is considered permanent, and the successive access requests to the resource are implicitly considered authorized. In the "one shot" modality, each time the application requests the access to the resource, the user has to authorize it. In the "session" modality the access to the resource needs the authorization by the user; however, once the authorization is granted, it is considered valid for the whole session, i.e. until the execution of the application is terminated or the terminal is kept on; at the next invocation of the application, or at the next terminal power up, a new authorization by the user will be necessary to grant access to the resource.

According to an embodiment of the present invention, the security level that is assigned to the generic software application intended to be installed and, possibly, successively executed on the mobile terminals 115-1, . . . , 115-5 is not static, i.e. it is not determined once and for all, as normally occurs during the application certification process, but it is intended to vary dynamically.

In particular, the trust provider 105 acts on behalf of the users of the mobile terminals 115-1, . . . , 115-5, and contributes to maintaining the integrity of the mobile terminals, by dynamically determining the appropriate security level to be assigned to the software applications intended to be installed or already installed on the mobile terminals 115-1, . . . , 115-5, and communicating to the mobile terminals the updated security level of the software applications that are installed/to be installed thereon.

The role of the trust provider 105 may be played by the operator of the mobile telecommunications network of which the users of the mobile terminals 115-1, . . . , 115-5 are subscribers. In fact, the mobile network operator already acts as a security provider for its users, in terms of authentication, channel encryption, and privacy protection. Moreover, it has the necessary technological and managing skills, it is trusted by the users, who already have signed contracts for the access to the mobile network, and it has resources and platforms, both on the network side and on the mobile terminal side, which may be advantageously exploited for realizing a security framework.

The trust provider 105 is in communications relationship with the mobile terminals 115-1, . . . , 115-5. Communications between the trust provider 105 and the mobile terminals 115-1, . . . , 115-5 may in particular take place OTA (Over The Air), exploiting the mobile telecommunications network resources, for example via SMS messages and/or MMS messages, and/or via a packet-based (e.g., GPRS) connection over an IP network. Preferably, the communications between the trust provider 105 and the mobile terminals 115-1, . . . , 115-5 are protected, for example using a digital signature mechanism (e.g., signed XML).

The trust provider 105 is also in communications relationship with external information sources, globally denoted 120, adapted to provide information useful to the trust provider 105 for dynamically determining, i.e. keeping updated the security level of the monitored software applications. In particular, and merely by way of example, the external information sources 120 may include the CERT (Computer Emergency Response Team, http://www.cert.org/), denoted as 120-1, which is a center of Internet security expertise, located at the Software Engineering Institute, a federally funded research and development center operated by Carnegie Mellon University, devoted to study Internet security vulnerabilities, research long-term changes in networked systems, and develop information and training to help improve security; another exemplary external information source is OVAL (Open Vulnerability and Assessment Language, http://oval.mitre.org/), denoted as 120-2, which is a standard language and methodology used to represent configuration information of systems for testing, aimed at analyzing the system for the presence of specified machine state (vulnerability, configuration, patch state, etc.). Further exemplary external information sources are the CVE (Common Vulnerabilities and Exposures, http://cve.mitre.org/), denoted as 120-3, which is a standardized dictionary for all the publicly known vulnerabilities and security exposures, the software vendors bulletins, denoted as 120-4, where the software producers and vendors publish the detected vulnerabilities of their software applications, possibly together with patches or work-around resolving the problem, and the software certification laboratories, i.e. the CAs, globally denoted as 120-5, which are in charge of testing and certifying the applications, according to well known schemes (such as Symbian Signed, Microsoft Mobile-2-Market or OMTP framework).

The trust provider 105 may also be in communications relationship with one or more other trust providers 105-1, 105-2, for example run by different mobile telecommunications network operators, in order to share information relevant to dynamically and timely determining the security level of the monitored software applications. This kind of data can be shared without any privacy concern, because security levels are tied to applications and not to users.

In FIG. 1, the arrows between pairs of mobile terminals 115-1, . . . , 115-5 are intended to represent direct peer-to-peer telecommunications channels between the mobile terminals, for example, but not limited to, short-range communications channels, like Bluetooth, ZigBee, NFC and the like, or full IP channels over GSM/GPRS/UMTS/HSDPA (High Speed Downlink Packet Access)/WiFi, if available; in a preferred embodiment of the present invention, the mobile terminals, exploiting these direct, peer-to-peer communications channels may share the information relating to the security level of the software applications installed and possibly running thereon, even without the need to establish a connection with the trust provider 105. This contributes to increasing the efficiency of the security framework and provides better bandwidth consumption.

Figure 2:
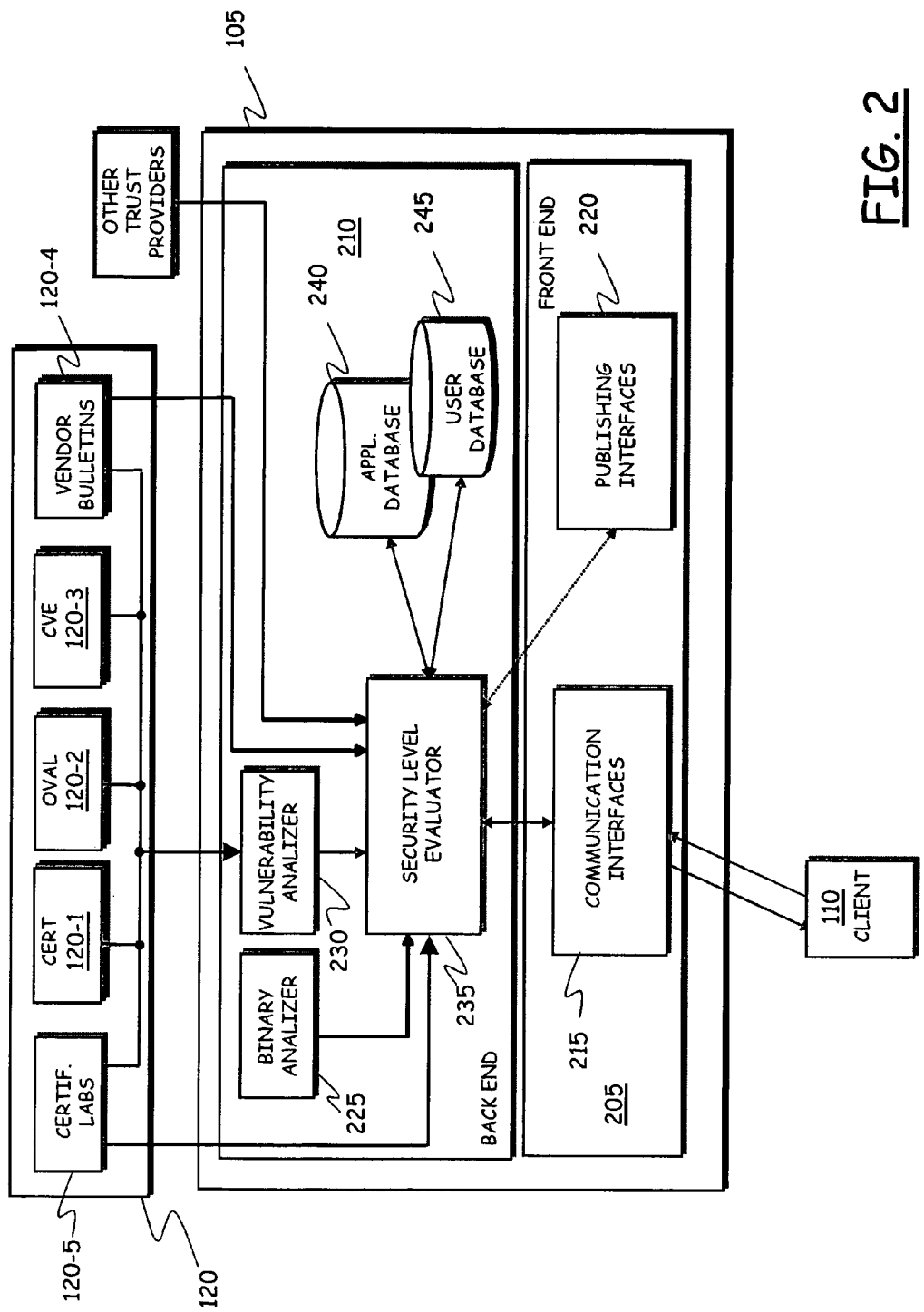
FIG. 2 schematically shows, in terms of functional blocks, the structure of a trust provider component of the system of FIG. 1.

Passing now to FIG. 2, the structure of the trust provider 105 is depicted in greater detail, in terms of the main functional blocks.

The trust provider 105, which acts as a server component in respect of the client components 110 installed and running on the mobile terminals, includes a front end 205 and a back end 210.

The front end 205 includes communication interfaces, denoted globally 215, for the communication with the clients 110 resident on the mobile terminals; such communication interfaces 215 include for example an SMS interface, an MMS interface, an IP interface, a broadcast channel interface (for instance to send information over the Cell Broadcast channel on GSM/GPRS/UMTS networks). The front end 205 of the trust provider 105 also comprises an information publishing interface 220, e.g. a web server accessible by third parties, like the users of the mobile terminals and the other trust providers, through web browsers; through the information publishing interface 220, the trust provider 105 publishes and makes accessible to third parties information like: the methodology adopted by the trust provider 105 to calculate the security level of the monitored software applications (this may take the form of a Security Level Evaluation Statement—SLES, a document intended to declare the security level evaluation methodology adopted); a list of monitored software applications with their current security levels, and, possibly, historical data concerning how the security level of the applications varied in time; past events relevant to the establishment of the security level of the monitored software applications. The access to this kind of information may be subject to an authentication process, in order to make the data available only to the authorized users and agents.

The back end 210 comprises a static or binary analyzer module 225, adapted to perform a static, i.e. binary analysis of the code of the software applications; a vulnerability analyzer module 230 is also provided, which, exploiting the information gathered from the external information sources 120, is adapted to analyze the vulnerabilities of the software applications. A security level evaluator module 235 is configured to receive the outputs of the binary analyzer module 225 and the vulnerability analyzer module 230, as well as to gather information from the external information sources 120, particularly from software producer/vendor bulletins 120-4, from CAs 120-5 and from other trust providers 105-1, 105-2 and, applying a predetermined metric (specified in the SLES published and maintained by the trust provider 105), calculates the security level to be assigned to each monitored software application. The security level is typically selected by the security level evaluator module among three or more levels. A software application database 240 is configured to store a list of all the software applications monitored by the trust provider 105, and the corresponding security levels (preferably, in addition to the current security level, the past security levels are also stored, so that the history of the software applications can be appreciated). A user database 245 stores the identifier and other details (e.g., details necessary for establishing communications with the users' mobile terminals or for billing purposes) of users that are subscribers to the trust provider 105, and, for each user, a list of software applications that are installed on the users mobile terminal.

Figure 3:
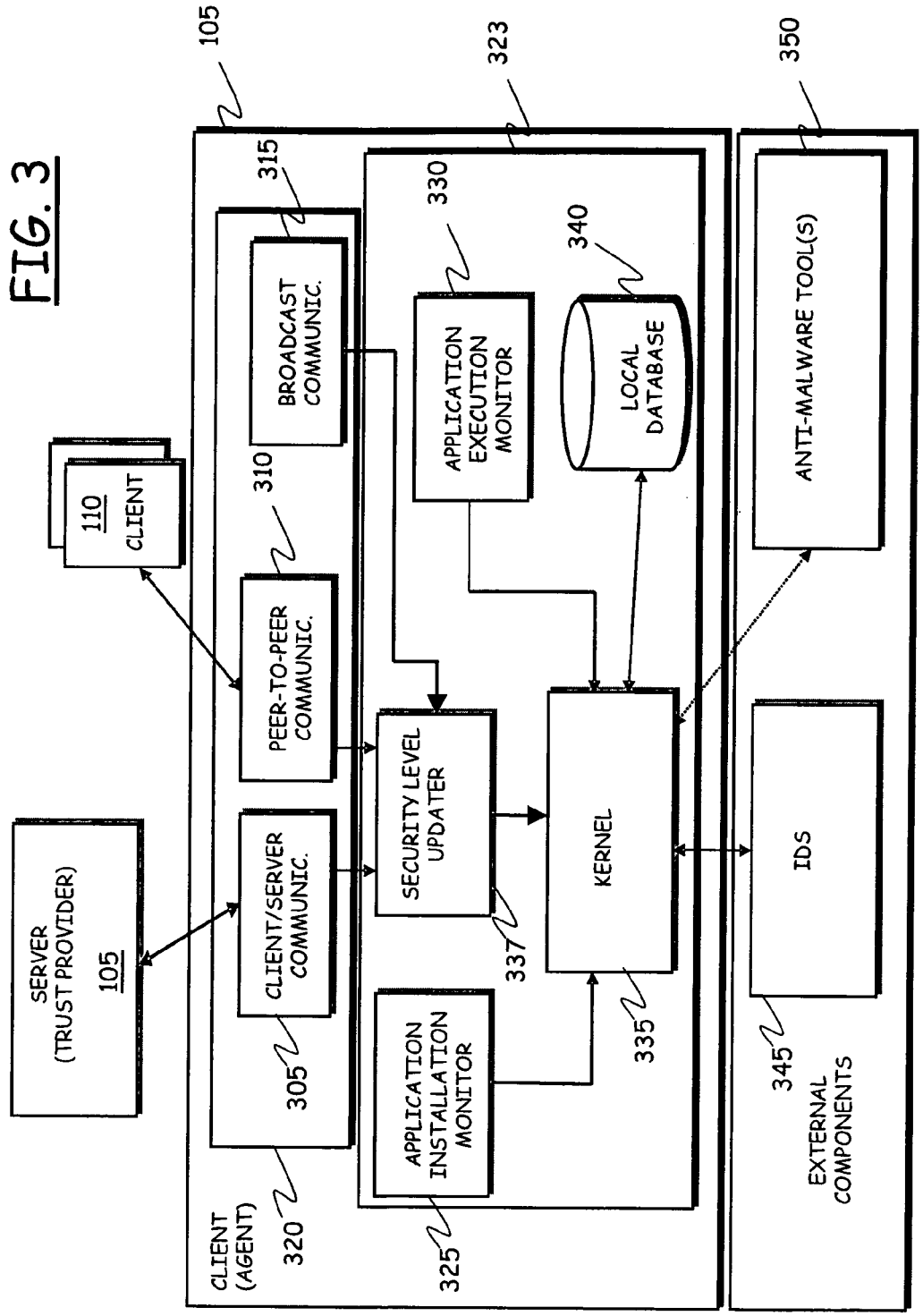
FIG. 3 schematically shows, in terms of functional blocks, the structure of a client component of the system of FIG. 1, resident on a terminal.

In FIG. 3 the structure of the client component 110 installed and running on the generic mobile terminal is depicted, in terms of the main functional blocks.

The client component 110 is a software agent running on the mobile terminals. The client component 110 includes a client/server communications module 305, adapted to manage the communications between the client component 110 and the server component represented by the trust provider 105. A peer-to-peer communications module 310 is preferably provided, adapted to manage the direct communications with other mobile terminals, exploiting for example short-range communications channels like Bluetooth, ZigBee, NFC, and the like, or full IP communications channels, over GSM/GPRS/UMTS/HSDPA. Moreover, a broadcast communications module 315 is also provided, in order to get information through the broadcast radio channels, such as the Cell Broadcast in the GSM/GPRS/UMTS network. The communications modules 305, 310, and 315 form a front end 320 of the client component 110.

The client component 110 also includes a monitor layer 323. The monitor layer 323 includes an application installation monitor module 325, adapted to detect the launching of activities related or leading to the installation of new software applications on the mobile terminal. The monitor layer 323 also includes an application execution monitor module 330, adapted to detect the launching of applications installed on the mobile terminal. A kernel module 335 is provided, that communicates with the application installation monitor module 325 and the application execution monitor module 330, and with a local database 340 configured to contain information like the current security level of the software applications installed on the mobile terminal, and the digital certificates of the trust provider 105 (possibly, the digital certificates of trust providers, like the trust providers 105-1 and 105-2, that are federated with the trust provider 105 are cross-certified; in this way, information about the security levels of software applications obtained, through the peer-to-peer communications channels, from mobile terminals that are subscribers to the other trust providers 105-1, 105-2 of the federation may be validated and recognized as both genuine and approved by the user's trust provider).

The kernel module 335 also interacts with a security level updater module 337, which manages the updating of the security levels of the software applications, establishing communications with the trust provider 105 (through the client/server communications module 305) and/or with other mobile terminals (through the peer-to-peer communications module 310), or just receiving updated information by means of broadcast radio channels, such as the Cell Broadcast (through the broadcast communication module 315).

The kernel module 335 may also communicate with external information sources (where by "external" there is meant external to the client component 110, but resident on the mobile terminal), like an Intrusion Detection System (IDS)

345 and other security tools 350, for example an anti-malware software or a personal firewall installed on the mobile terminal.

In the following, the operation of the security framework will be explained in detail.

The trust provider 105 maintains updated a dynamic level of security of the software applications installed on the mobile terminals of the user subscribers thereto.

Figure 4A:
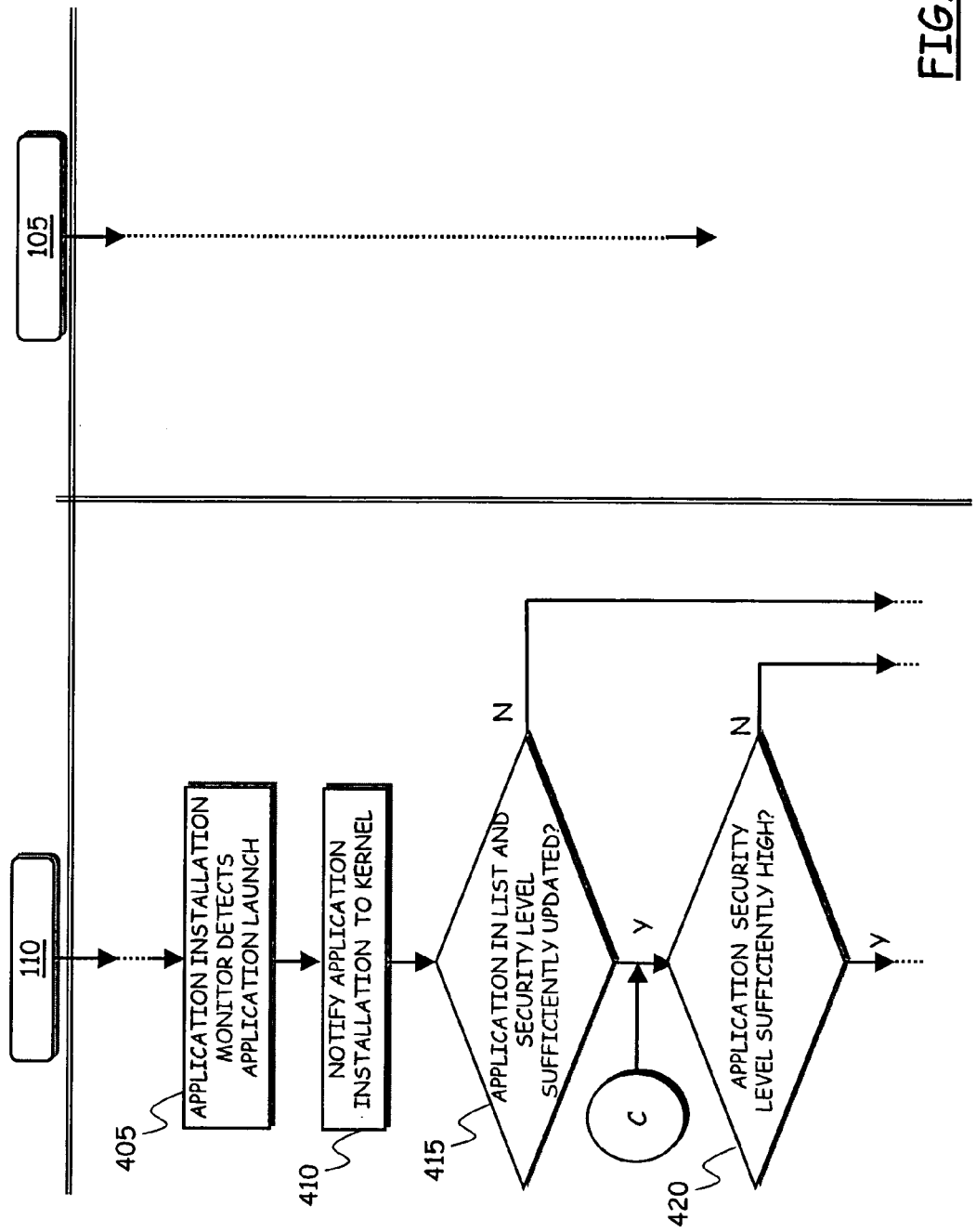
Figure 4C:
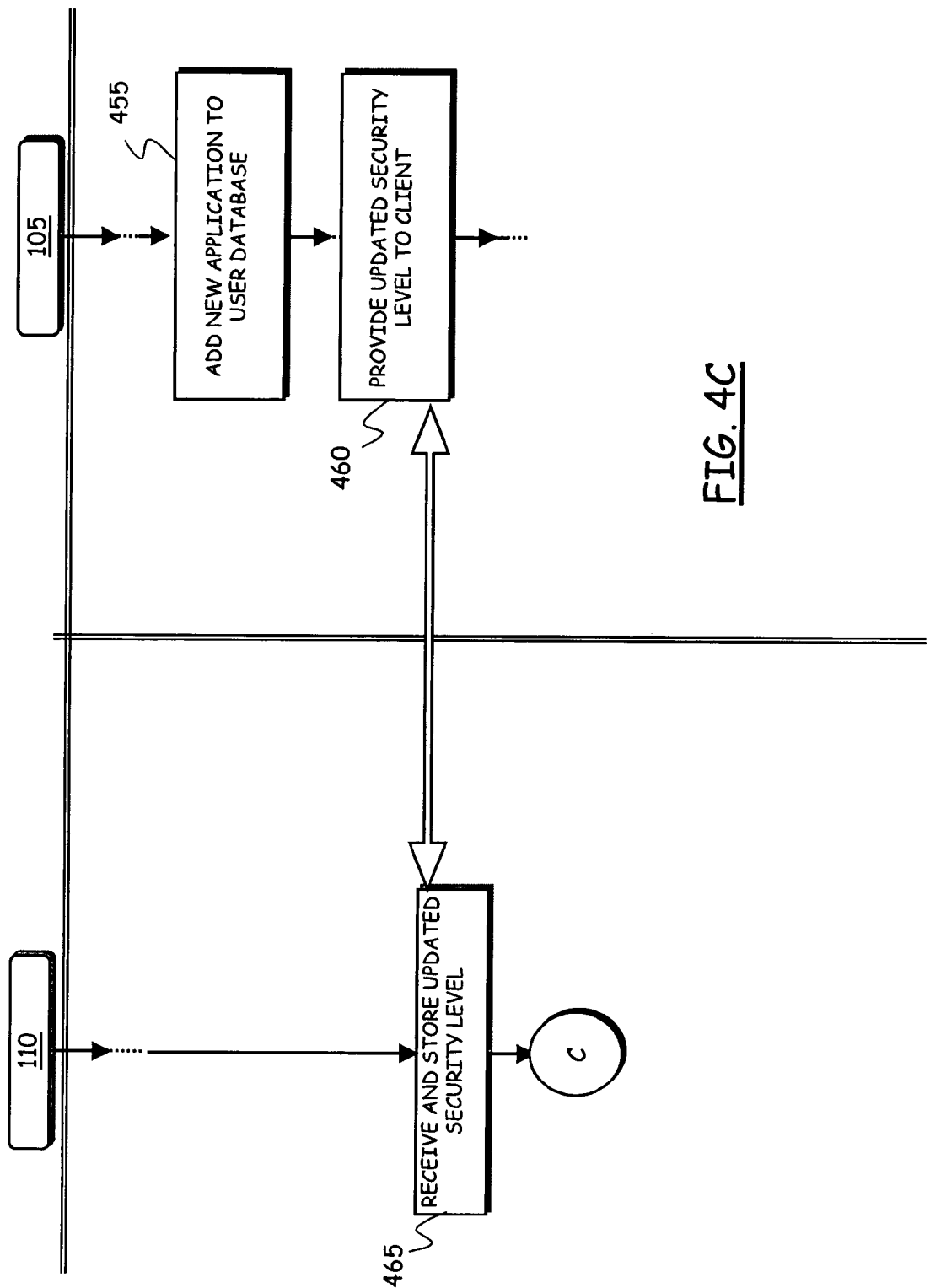

Referring to the simplified flowchart of FIGS. 4A, 4B and 4C, let it be assumed that, at a certain time, a new software application is to be installed on the mobile terminal: in this case the event is detected by the application installation monitor module 325 (block 405), which notifies it to the kernel module 335 (block 410). The kernel module 335, upon receiving the notification from the application installation monitoring module 330, looks into the local database 340 to ascertain whether the specified software application is already listed therein (meaning that the application is already monitored), and, in the affirmative case, it checks whether the security level of the software application is sufficiently up to date (decision block 415). In the affirmative case (decision block 415, exit branch Y), the kernel module 335 assesses whether the security level of the software application to be installed is sufficiently high, i.e. it is not below a predetermined, minimum security level (decision block 420): in the affirmative case (decision block 420, exit branch Y), the kernel module authorizes the installation of the application (block 425), which will therefore be allowed; in the negative case (decision block 420, exit branch N), the kernel module 335 may prevent the installation of the software application. It should be noted that the predetermined minimum security level may be optional: if not configured, the application will be always installed on the mobile terminal, and just limited, in terms of available mobile terminal APIs, by its corresponding security level.

In case the specified software application to be installed is not listed in the local database 340, or, even if it is listed, the security level thereof is not sufficiently up to date (decision block 415, exit branch N), the kernel module 335 invokes the security level updater module 337 to inform the server component that a new application is going to be installed on the mobile terminal, and to get the (updated) security level for the considered application (block 435).

The security level updater module 337 tries to establish a connection with the trust provider 105 (block 440) and, if the connection is successfully established, it informs the trust provider 105 that the installation of a new software application has been started on the mobile terminal. It also asks the trust provider 105 for the updated security level related to the specified software application (block 445).

The trust provider 105 receives the request from mobile terminal (block 450), updates the user database 245 adding the specified software application to the list of applications installed on the mobile terminal of the user (block 455), and then provides to the security level updater module 337 the current security level for the specified software application (block 460). In case the specified software application is not in the list of the monitored software applications, the trust provider can start a procedure for gathering information on that software application, and for calculating the corresponding security level. According to the specific metric adopted by the trust provider, the security level computation for a new application (i.e., an application not already monitored) may require time, and thus it may happen that it cannot be completed in real-time. In these cases, the trust provider can return a conservative security level (for instance the lower value), in order to limit the set of the APIs available to the application, at least for the time needed to complete the full security level computation. In these cases, the trust provider may also ask other federated trust providers for the security level related to the specific application.

The updated security level for the specified application is passed to the kernel module 335, and stored into the local database 340 (block 465).

The kernel module 335 can now assess the security level of the software application to be installed, and allows or prevents the installation depending on whether the security level of the application is below a predetermined, minimum security level (connector C, jumping back to decision block 420).

The security level updater module 337, in case the connection with the trust provider 105 cannot be established, or in addition to establishing a connection with the trust provider 105, may try to establish a connection with other mobile terminals, using the peer-to-peer communications module 310. If the security level updater module 337 cannot establish any kind of connection (for instance because the mobile terminal is offline), according to a preconfigured policy, the kernel module 335 may assign either a conservative security level (for instance the admissible lower level) or prevent the software installation until an updated security level for the considered application will be available.

Referring to the simplified flowchart of FIG. 5, let it now be assumed that, at a certain time, a software application installed on the generic mobile terminal 115-1 is launched. The application execution monitor module 330 detects this event (block 505), and notifies it to the kernel module 335 (block 510). The kernel module 335, upon receiving the notification from the application execution monitor module 330, checks if the application is already installed and monitored, i.e. if the application is already present in the local database 340. If the application is not present, the event is handled as an installation of a new application, as described in connection with FIGS. 4A to 4C. If instead the application is present in the local database 340, the kernel module 335 retrieves the associated security level from the local database 340. If the security level is sufficiently up to date, the kernel module 335 grants the execution and the API access to the application, based on its security level. Conversely, if the security level is not sufficiently up to date, the kernel module 335 invokes the security level updater module 337 in order to refresh the security level information stored in the database 340 (block 515).

The security level updater module 337 tries to establishes a connection with the trust provider 105 (block 520), and if the connection is established it asks to the trust provider 105 to provide the updated security level for the specified software application (block 525). The security level updater module 337, in case the connection with the trust provider 105 cannot be established, or in addition to establishing a connection with the trust provider 105, may try to establish a connection with other mobile terminals, using the peer-to-peer communications module 310.

The trust provider 105 receives the request from the mobile terminal, and provides thereto the current security level for the specified software application (block 530), taking it from the application database 240. Possibly, the trust provider 105, upon ascertaining that the specified software application is not in the list of software applications installed on the mobile terminal of that user, adds it to such a list (stored in the user database 245). In case the connection with the trust provider cannot be established, or in addition thereto, the mobile terminal may receive an updated security level for the specified application from one or more other mobile terminals; in this case, the security level updater module 337 may be adapted to assess which is the more recent security level for that software application: this may for example be done by associating, with the security level, an indication of the date and time the security level was last updated.

The updated security level is passed to the kernel module 335, and stored into the local database 340 (block 535).

If the security level updater module 337 cannot establish any kind of connection (for instance because the mobile terminal is offline), according to a preconfigured policy, the kernel module 335 may assign either a conservative security level (for instance the admissible lower level) or prevent the software execution until an updated security level for the considered application will be available.

Based on the security level, the kernel module 335 grants to the software application that has been launched conditional access to the resources of the mobile terminal, i.e. to the APIs exposed by the operating system associated to the specific application security level, according to the trust model implemented.

When a software application is uninstalled from the mobile terminal of a user, this event is communicated to the trust provider 105 (as soon as a network connection is detected and available), which then deletes the specified software application from the list of software applications installed on the mobile terminal of that user, stored in the user database 245.

The trust provider 105 may also implement push-type update mechanisms of the local database 340 of the mobile terminals (for instance by means of SMS, MMS, WAP push messages, Cell Broadcast messages), so as to provide to the client components 110 running on the mobile terminals updated security levels of the software applications installed thereon. Also, the client components, in addition to inquiring the trust provider 105 when a software application is launched or is being installed on the mobile terminal, may periodically contact the trust provider 105 to get updated security levels for the software applications installed thereon. In alternative or in addition to the periodical updating, the client component may operate on a sample basis, selecting a subset of applications among those installed on the mobile terminal (for instance the most frequently used) and for them requesting the updated security level.

The client components 110 resident on the mobile terminals may also notify to the trust provider 105 anomalous events, detected for example by IDS or anti-malware tools 345 or 350 installed on the mobile terminal. Upon receiving such notifications, the trust provider may take the steps necessary to identify which of the software application(s) installed on the mobile terminal caused the anomalous events (for instance correlating the anomalous events sent by different users), and put the identified applications in a list of applications that need to be more carefully analyzed; these applications may for example be tested in depth in laboratory.

Hereinafter an example of a method implemented by the trust provider 105 for calculating the security level of the software applications is discussed. It is pointed out that the calculation method described below is merely exemplary, and not to be construed limitatively for the present invention, because several alternative methods are possible.

The binary analyzer module 225 is adapted to analyze statically the binary code of the generic software application. The static analysis is performed statically analyzing the executable code, without analyzing all the possible dynamic behaviors or the execution paths of the software application. The static analysis may in particular ascertain the type of the APIs that the software application invokes, details of the installation of the software application (e.g., if the autorun feature is exploited), the nature of the accessed data. Based on the analysis performed, the binary analyzer module 225 may assign a value to a parameter or set of parameters AS to be passed to the security level evaluator module.

The vulnerability analyzer module 230 is adapted to assess the vulnerabilities of a software application whose security level is to be evaluated. The vulnerability analyzer module 230 is adapted to retrieve information useful for assessing the vulnerabilities from external information sources like the CERT, the OVAL/CVE, the bulletins of the software producers and vendors, the software certification authorities. The vulnerability analyzer module 230 is adapted to provide to the security level evaluator module 235 an indication of the overall number of vulnerabilities found for the considered software application, the level of criticality of each encountered vulnerability, and an estimation of when the next criticality will be found, by means of statistical and predictive analyses. Based on the analysis performed, the vulnerability analyzer module 230 may assign a value to a parameter or set of parameters AV to be passed to the security level evaluator module.

Another parameter that is useful to the security level evaluator module for establishing the security level of an application is the reaction time of the software producer/vendor to the detection/publication of a new vulnerability, i.e. the indication of the time needed by the software producer/vendor for finding a remedy to the detected/published vulnerability. A parameter or set of parameters TR may be defined whose value depends on the time needed for the publication of a remedy after a vulnerability is detected/published, the efficacy of the published remedy, workaround or patch, the criticality of the vulnerability to which the remedy has been published.

The security level evaluator module may additionally assign a value to a parameter or set of parameters AF defining the reliability of the software producer/vendor; in this way, enterprises that, in their history, have proved to be capable of producing/distributing secure, reliable software products affected by less vulnerabilities may be privileged.

In the process of evaluating the security level of a certain software application, the trust provider 105 may further take into account the presence of any certification, declaration or assurance, issued by a recognized authority, such as those related to Symbian Signed, Microsoft Mobile2Market, Common Criteria, or ITSEC. The presence of such a certification may affect the value of a parameter or set of parameters AC.

A further source of useful information for determining the security level of a software application are the notifications coming from the mobile terminals themselves, for example anomalies detected by anomaly detection or intrusion detection tools resident on the mobile terminals. As mentioned in the foregoing, when an IDS or an anti-malware software tool resident on the generic mobile terminal detects an anomaly behavior, or just an intrusion, by a malware, they may signal it to the client component 110, which then notifies the event to the trust provider 105 (possibly conditioned to the authorization of the mobile terminal user). The trust provider, knowing which are the software applications that are installed on the mobile terminal of that user, can carry out an analysis to identify, by correlating the information possibly coming from different mobile terminals, which is the software application(s) that most likely caused the anomaly. The trust provider may also perform more detailed analysis such as a static analysis of the code or blackbox analysis (i.e., analysis that do not make assumptions on the implementation choices made during the development of a software application, limiting to observe and analyze the inputs and outputs of the application). This type of analysis affects the value of a parameter or set of parameters AD.

In the evaluation of the security level to be assigned to a software application, the trust provider may also set a time window for the analysis, for example considering the number of vulnerabilities detected and published in the last predetermined number (e.g., twelve) months. The set time window is specified as the value of a parameter t.

Using the above discussed evaluation elements, the metric adopted by the security level evaluation module for calculating the security level of a software application may be expressed as:

$$SL_{APP}(t)=f(AS,AV,TR,AF,AC,AD,t)$$

where $f( )$ denotes a function having a predetermined form, and AS, AV, TR, AF, AC, AD and t are parameters that correspond to the evaluation elements described above.

Depending on the case, the trust provider may apply one among a plurality of functions $f( )$, for example based on the type of user. For example, a function $f_{Consumer}( )$ should be defined for consumer users that do not want to give up the possibility of installing and executing a generic software application on their terminals. Another function $f_{Enterprise}( )$ should be defined for users employees of a customer enterprise, having stricter security standards.

A possible function $f( )$ is a weighted sum of the parameters:

$$SL_{APP}(t) = \frac{\omega_{AS}AS(t) + \omega_{AV}AV(t) + \omega_{TR}TR(t) + \omega_{AF}AF(t) + \omega_{AC}AC(t) + \omega_{AD}AD(t)}{\omega_{AS} + \omega_{AV} + \omega_{TR} + \omega_{AF} + \omega_{AC} + \omega_{AC}}$$

where the weights may be differentiated based on the type of users:

$$\Omega_{Consumer}=(\omega'_{AS},\omega'_{AV},\omega'_{TR},\omega'_{AF},\omega'_{AC},\omega'_{AD})$$

$$\Omega_{Enterprise}=(\omega''_{AS},\omega''_{AV},\omega''_{TR},\omega''_{AF},\omega''_{AC},\omega''_{AD})$$

these being two sets of weight factors specific for consumer users and for enterprise users, respectively.

The present invention overcomes the problems of current static certification systems, in terms of high costs and organization.

Thanks to the present invention, software applications are assigned security levels that may vary dynamically in time, being periodically re-calculated by means of a well recognized evaluation metric so as to track changes in the security aspects of software applications; this allows implementing policies that rewards software applications that have demonstrated on the field their security.

Moreover, the present invention contributes to reduce the security risks associated to both malware and exploitable applications. Once a malware is detected, the corresponding security level is an information for the agent on the mobile terminal to prevent the application from running (and possibly to delete it). In case of an exploitable application, the security level is lowered until a work around or a patch will be released, making the application executable, but at the same time limiting is the resources made available on the mobile terminal. This limit is put in order to also reduce the risk of damages produced by malware which exploits the application vulnerability. It should be noted that, within this period (up to the work around or the patch) the application is still available to users.

The solution according to the present invention is very flexible, particularly in terms of the business models that can be set up; the costs for keeping the security level information available at the mobile terminal updated may for example be sustained by the trust provider, that may set up toll-free telephone numbers for the connection thereto by the mobile terminals of subscriber users; in case the role of the trust provider is played by the mobile network operator, these costs may be included in the service agreement with the users.

The system according to the present invention enables the mobile telecommunications network operators to play a central role in the enforcement of security on the mobile terminals, and this is believed to be advantageous not only for the operators themselves (in terms of network protection), but also for the users, who can rely on a trusted counterpart having the technical and organizational skills.

Another advantage of the system according to the present invention is that it does not exclude an important category of applications like those falling under the open source software category, because the software producers are not required to sustain high certification costs.

The system according to the present invention can be easily integrated with existing solutions, based for example on the previously described trust model.

The present invention has been herein described making reference to an exemplary and non-limitative embodiment thereof. Those skilled in the art will recognize that several modifications can be made to the described embodiments, for example in order to satisfy contingent needs, as well as several other embodiments are possible, without departing from the scope of protection set forth in the appended claims.

For example, nothing prevents from implementing the software agent in the SIM to be operatively associated with the telecommunications terminal for its operation in the telecommunications network.

The invention claimed is:

1. A system comprising:
   at least one telecommunications terminal comprising data processing capabilities, the telecommunications terminal being susceptible of having installed thereon software applications, wherein a plurality of software applications are monitored, and wherein each of the plurality of monitored software applications has associated therewith a respective numerical value indicating a level of security of the corresponding software application, said numerical value indicating the level of security being susceptible of varying in time;
   a software agent executed by the at least one telecommunications terminal, said software agent capable of being adapted to conditionally allow the installation of software applications on the telecommunications terminal based on the respective level of security; and
   a server in communications relationship with the software agent, said server being adapted to dynamically calculate the numerical value indicating the level of security of each of the monitored software applications, and to communicate to the software agent, the calculated numerical value indicating the level of security of the monitored software applications to be installed on said telecommunications terminal,
   wherein said server comprises:
   a binary analyzer adapted to perform a static analysis of codes of the software applications; and
   a vulnerability analyzer adapted to perform an analysis of vulnerabilities exhibited by the software applications,
   wherein said vulnerability analyzer comprises an adaptation to perform said analysis of vulnerabilities based on information obtained from one or more among a computer emergency response team, an open vulnerability and assessment language, common vulnerabilities and exposures bulletins of the software applications producers/vendors, and software certification authorities.

2. The system of claim 1, wherein said software agent further comprises an adaptation to:
   detect an incipient activity of installation of a software application on the telecommunications terminal; and
   request to the server an updated security level with respect to the software application to be installed.

3. The system of claim 1, wherein the telecommunications terminal is further susceptible of executing software applications installed thereon, said software agent further comprising an adaptation to conditionally allow the software applications, when executed on the telecommunications terminal, to access telecommunications terminal resources based on the level of security of the software application being executed.

4. The system of claim 3, wherein said telecommunications terminal resources comprise application program interfaces exposed by an operating system governing the operation of the telecommunications terminal.

5. The system of claim 3, wherein the software agent further comprises an adaptation to:
   detect the launching of a software application installed on the telecommunications terminal; and
   request from the server an updated security level with respect to the software application being launched.

6. The system claim 5, wherein said software agent further comprises a local database adapted to store the security levels of the software applications installed on the telecommunications terminal.

7. The system of claim 6, wherein said software agent further comprises an adaptation to request from the server the updated security level with respect to the software application being launched on condition that a security level stored in the local database for the software application is not up to date.

8. The system of claim 1, wherein said binary analyzer comprises an adaptation to perform said static analysis by assessing a type of telecommunications terminal resources invoked by the software applications.

9. The system of claim 1, wherein said binary analyzer comprises an adaptation to perform said static analysis by assessing a modality of installation of the software applications on the telecommunications terminal.

10. The system of claim 1, wherein said binary analyzer comprises an adaptation to perform said static analysis by assessing a type of data accessed by the software applications.

11. The system of claim 1, wherein said vulnerability analyzer comprises an adaptation to perform said analysis of vulnerabilities based on an indication of an overall number of known vulnerabilities detected for the software applications.

12. The system of claim 1, wherein said vulnerability analyzer comprises an adaptation to perform said analysis of vulnerabilities based on a degree of criticality of the detected vulnerabilities.

13. The system of claim 1, wherein the server comprises:
   a first database adapted to store a list of software applications monitored by the server, and a respective level of security.

14. The system of claim 13, wherein the server comprises:
   a second database adapted to store a list of software applications installed on the at least one telecommunications terminal.

15. The system of claim 1, further comprising at least a second telecommunications terminal, the software agent being adapted to receive from said second telecommunications terminal information related to the level of security of said software applications.

16. The system of claim 1, wherein said software agent further comprises an adaptation to:
   gather information from one or more anti-malware software applications or an intrusion detection system running on the telecommunications terminal; and
   communicate the gathered information to said server, said server further comprising an adaptation to:
   receive from the telecommunications terminal the gathered information; and
   use the received information for dynamically calculating the security levels of software applications.

17. A telecommunications terminal having data processing capabilities, the telecommunications terminal being susceptible of having installed thereon software applications or executing software applications installed thereon, wherein a plurality of software applications are monitored, and wherein each of the plurality of software applications has associated therewith a respective numerical value indicating a level of security of the corresponding software application, comprising:
   a software agent, adapted to be executed by the telecommunications terminal, said software agent comprising an adaptation to at least one among:
   conditionally allow the installation of software applications on the telecommunications terminal; and
   conditionally allow the software applications, when executed on the telecommunications terminal, to access telecommunications terminal resources based on the respective level of security, and to receive from a server updated numerical values indicating levels of security calculated by the server,
   wherein said server comprises:
   a binary analyzer adapted to perform a static analysis of codes of the software applications; and
   a vulnerability analyzer adapted to perform an analysis of vulnerabilities exhibited by the software applications,
   wherein said vulnerability analyzer comprises an adaptation to perform said analysis of vulnerabilities based on information obtained from one or more among a computer emergency response team, an open vulnerability and assessment language, common vulnerabilities and exposures bulletins of the software applications producers/vendors, and software certification authorities.

18. The telecommunications terminal of claim 17, wherein said software agent further comprises an adaptation to:
   detect an incipient activity of installation of a software application on the telecommunications terminal or detect the launching of a software application installed on the telecommunications terminal; and
   request to the server an updated security level with respect to the software application to be installed or of the software application being launched.

19. The telecommunications terminal according to claim 18, wherein said software agent further comprises a local database adapted to store the security levels of the software applications installed on the telecommunications terminal.

20. The telecommunications terminal of claim 19, wherein said software agent, further comprises an adaptation to request from the server the updated security level with respect to the software application being launched on condition that a security level stored in the local database for the software application is not up to date.

21. A server including at least one hardware component, comprising:
- a communication interface to communicate with at least one telecommunications terminal having data processing capabilities,
- wherein the telecommunications terminal is capable of having installed or run thereon software applications, wherein a plurality of software applications are monitored, and wherein each of the plurality of monitored software applications has associated therewith a respective numerical value indicating a level of security of the corresponding software application, said numerical value indicating the level of security being capable of varying in time,
- said server comprising:
  - a security level evaluator to dynamically calculate the numerical value indicating the level of security of each of the plurality of monitored software applications, and to communicate to a software agent the calculated numerical value indicating the level of security of each of the plurality of monitored software applications to be installed or run on said telecommunications terminal,
  - a binary analyzer adapted to perform a static analysis of codes of the software applications; and
  - a vulnerability analyzer adapted to perform an analysis of vulnerabilities exhibited by the software applications,
- wherein said vulnerability analyzer comprises an adaptation to perform said analysis of vulnerabilities based on information obtained from one or more among a computer emergency response team, an open vulnerability and assessment language, and common vulnerabilities and exposures bulletins of the software applications producers/vendors, and software certification authorities.

* * * * *